(12) United States Patent
Hsu et al.

(10) Patent No.: US 8,576,364 B2
(45) Date of Patent: Nov. 5, 2013

(54) METHOD FOR FORMING MULTIPLE ALIGNMENT FILMS ON A SUBSTRATE AND PIXEL STRUCTURE OF A LIQUID CRYSTAL DISPLAY

(71) Applicant: AU Optronics Corp., Hsinchu (TW)

(72) Inventors: Wei-Tse Hsu, Hsinchu (TW); Hung-Lung Hou, Hsinchu (TW); Yu-Wei Liu, Hsinchu (TW); Ren-Bin Lin, Hsinchu (TW); Yi-Ting Lee, Hsinchu (TW); Chin-Hsuan Dai, Hsinchu (TW); Norio Sugiura, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 13/673,431

(22) Filed: Nov. 9, 2012

(65) Prior Publication Data

US 2013/0063689 A1    Mar. 14, 2013

Related U.S. Application Data

(62) Division of application No. 12/250,337, filed on Oct. 13, 2008.

(30) Foreign Application Priority Data

Dec. 21, 2007 (TW) ................ 96149269 A

(51) Int. Cl.
*G02F 1/1368* (2006.01)
*G02F 1/1337* (2006.01)

(52) U.S. Cl.
USPC ............................................ 349/129; 349/43

(58) Field of Classification Search
USPC ........................................................ 349/129
See application file for complete search history.

(56) References Cited

U.S. PATENT DOCUMENTS

| 5,856,857 A | 1/1999 | Kim |
| 6,081,314 A | 6/2000 | Suzuki et al. |

(Continued)

FOREIGN PATENT DOCUMENTS

| CN | 1782823 | 6/2006 |
| CN | 101030001 | 9/2007 |

(Continued)

OTHER PUBLICATIONS

English translation of abstract and pertinent parts of CN 101075029.

(Continued)

*Primary Examiner* — Eric Wong
(74) *Attorney, Agent, or Firm* — McClure, Qualey & Rodack, LLP

(57) ABSTRACT

A method for forming the alignment films on the substrate and a pixel structure of a liquid crystal display are disclosed. The pixel structure comprises a plurality of pixel units arranged in arrays. Each of the pixel units comprises a first substrate, a second substrate, two first alignment films and two second alignment films. The first alignment film is different from the second alignment film. The second substrate is disposed opposite to the first substrate. The two first alignment films and the two second alignment films are individually disposed on the first substrate and the second substrate, while each of the first alignment films is disposed substantially opposite to one of the second alignment films. The method for forming the alignment films comprises the following steps: (1) forming a trench on the substrate to divide each of the pixel units into a first sub-pixel area and a second sub-pixel area, (2) forming the first alignment film on the first sub-pixel area of the substrate and then, (3) forming a second alignment film on the second sub-pixel area of the substrate at last.

17 Claims, 9 Drawing Sheets

(56) References Cited

U.S. PATENT DOCUMENTS

| | | |
|---|---|---|
| 6,781,656 B2 | 8/2004 | Yoshida et al. |
| 7,256,849 B2 * | 8/2007 | Kim et al. .................... 349/129 |
| 7,440,056 B2 * | 10/2008 | Kobayashi .................... 349/117 |
| 7,545,476 B2 | 6/2009 | Ting |
| 2003/0133065 A1 | 7/2003 | Okada et al. |
| 2005/0062920 A1 | 3/2005 | Chaudhari et al. |
| 2006/0204903 A1 * | 9/2006 | Choi et al. .................... 430/321 |
| 2006/0285044 A1 | 12/2006 | Liu et al. |
| 2007/0153189 A1 | 7/2007 | Ting |
| 2008/0143933 A1 | 6/2008 | Sha et al. |

FOREIGN PATENT DOCUMENTS

| | | |
|---|---|---|
| CN | 101075029 | 11/2007 |
| TW | 200706963 | 2/2007 |

OTHER PUBLICATIONS

English translation of abstract and pertinent parts of CN 101030001.
English translation of abstract and pertinent parts of CN 1782823.
China Office Action mailed Feb. 28, 2011.
Taiwan Office Action mailed Oct. 26, 2011.
English translation of abstract of TW 200706963 A.

\* cited by examiner

METHOD FOR FORMING MULTIPLE ALIGNMENT FILMS ON A SUBSTRATE AND PIXEL STRUCTURE OF A LIQUID CRYSTAL DISPLAY

CROSS-REFERENCES TO RELATED APPLICATIONS

This is a divisional application of patent application Ser. No. 12/250,337 filed on Oct. 13, 2008. The prior application Ser. No. 12/250,337 claims the benefit of Taiwan Patent Application No. 096149269 filed on Dec. 21, 2007, the disclosures of which are incorporated herein by reference in their entirety.

BACKGROUND OF THE INVENTION

1. Field of the Invention

The present invention provides the pixel structure of a liquid crystal display (LCD) and a forming method thereof. In particular, the pixel structure has multiple distinct alignment films and the forming method thereof.

2. Descriptions of the Related Art

Currently in common liquid crystal displays (LCDs), the alignment orientations of the liquid crystal molecules are altered by applying voltages externally to acquire varied optical characteristics. For example, a twisted nematic (TN) type LCD basically comprises an upper and a lower conductive glass substrates, a nematic liquid crystal layer injected between the substrates, two polarizers disposed on the outer surfaces of the two substrates respectively, and alignment films coated on the conductive glass substrates with very fine trenches formed therein by rubbing. The fluidity of the liquid crystal molecules tends to align the molecules along the trench direction. The trenches in the alignment films of the upper and the lower conductive glass substrates differ from each other by 90°. Consequently, when filled into the trenches of the upper and the lower substrates, the liquid crystal molecules will be aligned along the trench directions, with the liquid crystal molecules in the middle subjected to the smaller binding force. Those molecules closer to the trenches of the substrates are subjected to a larger binding force. In general, the liquid crystal molecules will be aligned at a twisted angle of 90°.

When there is no voltage applied, the light entering the liquid crystal element propagates with the polarization that changes according to the twisted direction of the liquid crystal molecules. Because the upper and lower polarizers have the same directions as the upper and lower alignment films respectively, the light is transmitted through the liquid crystal elements to provide brightness. In contrast, when a voltage is applied, the liquid crystal molecules are aligned towards a direction in which the electric field is applied and are consequently aligned perpendicularly to the alignment films. In this case, the light will not be able to transmit through the second polarizer, thus yielding darkness. Such alternate bright and dark statuses may be used for display purposes.

As another example, in a vertical alignment (VA) LCD, protrusions are used to cause the liquid crystal molecules to present a pre-tilt angle in a stationary alignment status, so that when applied with a voltage, the liquid crystal molecules will tilt towards various orientations rapidly. The light from the back light source can be transmitted through rapidly after applying the voltage to shorten the display response time remarkably. Furthermore, because the protrusions lead to a change in the orientation of the liquid crystal molecules, the liquid crystal molecules may reinforce each other when the LCD is viewed from different angles, thus obtaining an enlarged viewing angle range.

In current thin-film transistor liquid crystal displays (LCD-TFTs), the glass substrates are coated with an alignment material to provide a certain alignment effect. However, since the rubbing alignment method may provide alignment in only one single direction, gray-scale inversion tends to occur at particular viewing angles. Moreover, in VA type LCDs, the color is washed out at large viewing angles, resulting in a significantly degraded chroma viewed by a viewer at large viewing angles.

In an attempt to solve the aforementioned problems, some patents have proposed to pattern the alignment films by a development and etching process or to modify the alignment films with plasma. However, all of these methods require additional photo-resist coatings, exposures, development and etching, which not only increases the complexity of the manufacturing process, but also leads to lengthened processing time and increasing costs. In summary, it is highly desirable in the art to overcome the problems associated with the alignment of different alignment films by a simple manufacturing process.

SUMMARY OF THE INVENTION

One objective of this invention is to provide a pixel structure for a thin-film transistor liquid crystal display (TFT-LCD). The pixel structure comprises a plurality of pixel units arranged in arrays. Each of the pixel units comprises a first substrate, a second substrate, two first alignment films and two second alignment films. The second substrate is disposed opposite to the first substrate. The two first alignment films are respectively disposed on the first substrate and the second substrate, and the two second alignment films are also respectively disposed on the first substrate and the second substrate. The first alignment films are formed from an alignment material different from that of the second alignment films. Each of the first alignment films is disposed substantially opposite to one of the second alignment films.

Another objective of this invention is to provide a method for forming multiple alignment films on a substrate, wherein the substrate comprises a plurality of pixel areas arranged in arrays. The method comprises the following steps: forming a plurality of trenches on the substrate to divide each of the pixel areas into two sub-pixel areas, and each of the two sub-pixel areas is surrounded by the trench; forming a first alignment film on the substrate in one of the two sub-pixel areas, and not in the trench; and forming a second alignment film on the substrate in the other sub-pixel area, and not in the trench, and in such a way that for two adjacent pixel areas in at least one portion of the substrate, the first alignment films of the two adjacent pixel areas are disposed adjacent to each other. The second alignment films of the two adjacent pixel areas are also disposed adjacent to each other.

Yet a further objective of this invention is to provide a method for forming multiple alignment films on a substrate, wherein the substrate comprises a plurality of pixel areas arranged in arrays. The method comprises the following steps: forming a plurality of trenches on the substrate to divide each of the pixel areas into two sub-pixel areas, and each of the two sub-pixel areas is surrounded by the trench; forming a first alignment film on the substrate in one of the two sub-pixel areas, and not in the trench; and forming a second alignment film on the substrate in the other sub-pixel area, and not in the trench, and in such a way that for two adjacent pixel areas in at least one portion of the substrate, the first alignment film of one pixel area is disposed adjacent to the second alignment film of the other pixel area.

According to this invention, by performing a particular treatment to the glass substrates of an LCD, different alignment film materials are coated on different areas of the pixels without need of additional development and etching processes. Consequently, the gray-scale inversion in the TN mode LCD and the color wash-out at large viewing angles in a VA mode LCD are overcome, thus improving the display performance of the LCDs.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

According to this invention, by performing a particular treatment to the glass substrates in LCDs, e.g., by applying this invention to color the filter (CF) glass substrates and thin-film transistor (TFT) glass substrates, different alignment film materials are coated on different pixel areas to control the different pre-tilt angles of liquid crystal molecules in the pixel areas. This will be described in detail hereinafter.

Figure 1:
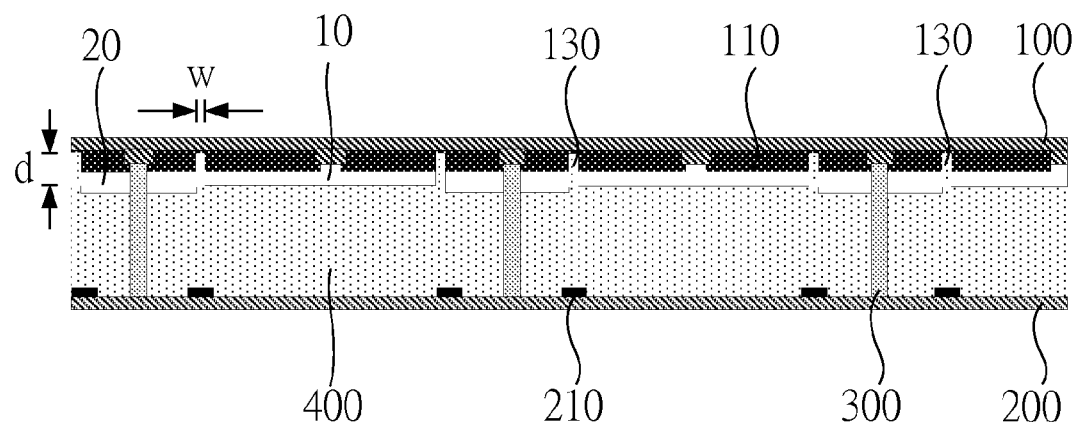
FIG. 1 depicts an example in which this invention is applied to a CF glass substrate of the LCD in an embodiment.
Figure 4A:
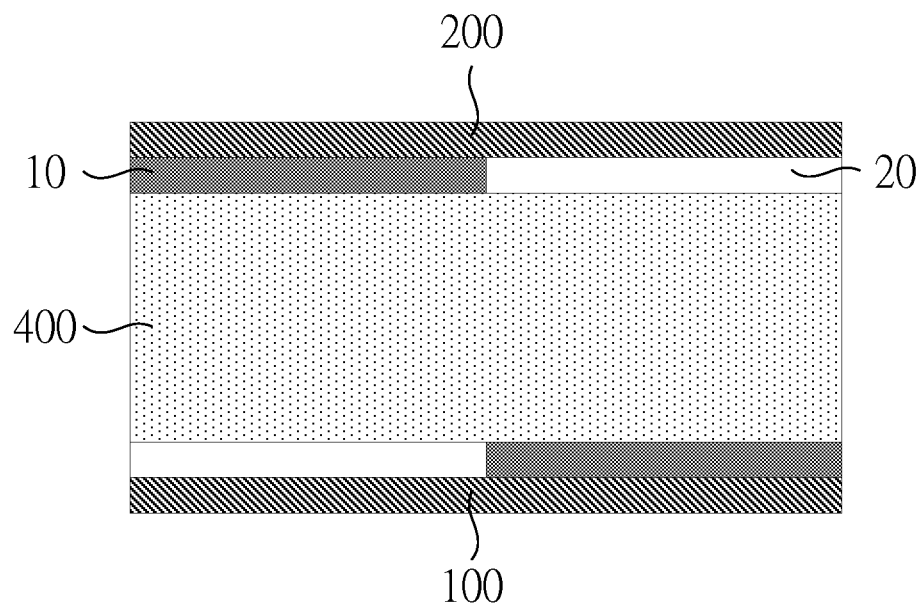
FIGS. 4A and 4B are schematic views of pixel units with different alignment film arrangements in the pixel structure of an LCD in accordance with this invention respectively.
Figure 4B:
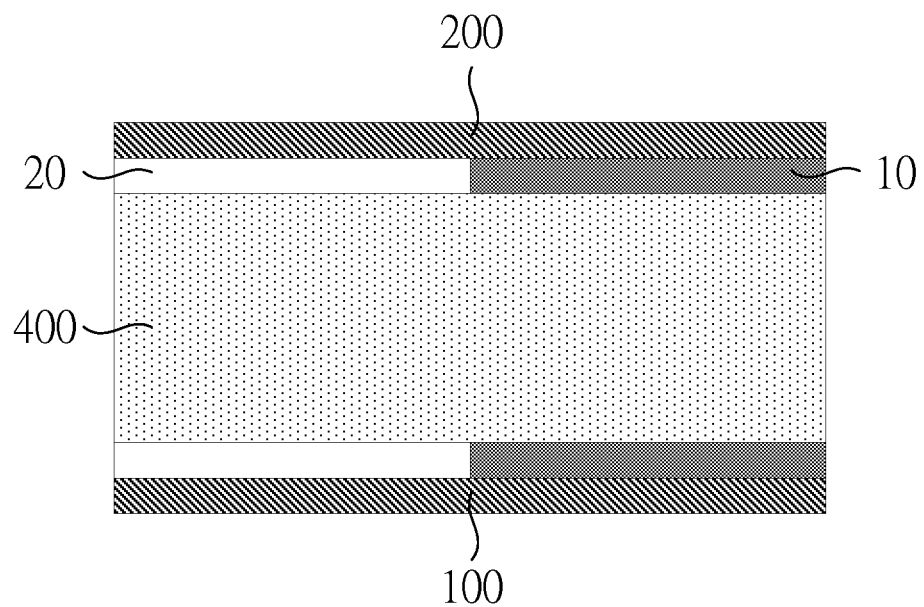

FIG. 1 illustrates a partial view of a pixel structure in a TFT-LCD. The pixel structure comprises a plurality of pixel units arranged in arrays, e.g., a plurality of pixel units arranged in arrays as shown in FIG. 4A and FIG. 4B. The portion of the pixel structure illustrated comprises a first substrate 100, a second substrate 200 and a photo-resist spacer (PS) 300 interposed between the first substrate 100 and the second substrate 200. The first substrate 100 and the second substrate 200 are correspondingly disposed with a liquid crystal layer 400 of the LCD filled in a gap between the first substrate 100 and second substrate 200. In this embodiment, the first substrate 100 can be a CF glass substrate, while the second substrate 200 can be a TFT glass substrate. The CF glass substrate 100 is coated with a color-resist 110 consisting of red, green, blue colors and/or other colors thereon, while the TFT glass substrate 200 comprises a number of pixel storage capacitors 210 spaced apart from each other. It should be noted that other elements irrelevant to this invention disposed on the first substrate 100 and the second substrate 200 are omitted from depiction.

The embodiment illustrated in FIG. 1 is an example in which this invention is applied to a CF glass substrate in an LCD. It should be noted that, as will be appreciated by those of ordinary skill in the art, this invention may also be applied to a TFT glass substrate in an LCD, which is omitted from description herein. In this embodiment, at least one first trench 130 with a width (w) and a length (l) is disposed on the color resist 110 of the first substrate 100 in a spaced-apart relation. In practical applications, the trench has a depth (d) substantially ranging from 0.5 micrometer (μm) to 10 μm and a width (w) substantially ranging from 1 μm to 50 μm. However, the depth (d) and width (w) of the trench may vary according to the design or location of the trench in a pixel. The first trenches 130 spaced apart may further divide each pixel area of the entire pixel structure into two or more than two sub-pixel areas to facilitate the coating of different alignment film materials on each of the pixel areas. As a result, the different pre-tilt angles (not shown) will be obtained for liquid crystal molecules in each of the pixel areas, thus achieving a multi-domain division. Furthermore, the first trenches 130 are preferably arranged on the first substrate 100 at locations opposite to the pixel storage capacitors 210 on the second substrate 200 to mitigate the loss of the aperture ratio.

In this invention, a first alignment film 10 and a second alignment film 20, made of two different alignment materials, are disposed on the color resists 110 at both sides of each first trench 130. The one of two alignment materials is selected from one of a group consisting of the following: a twisted nematic (TN) alignment material, a vertical alignment (VA) material and an in-plane switching (IPS) alignment material. Furthermore, the first alignment film 10 and the second alignment film 20 may be either the same or different in terms of thickness, which ranges from about 100 angstroms (Å) to 10,000 Å. Because the first alignment material 10 and the second alignment material 20 are made of materials different from each other, each of the pixel areas in the LCD of this invention has different alignment film materials.

Figure 2A:
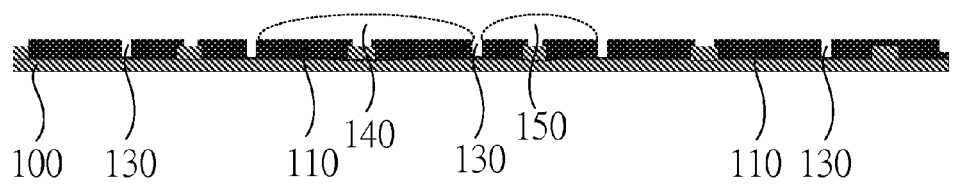
FIGS. 2A, 2B, 2C and 2D depict a manufacturing process flow for forming alignment films on a substrate.

With reference to FIGS. 2A to 2D, the manufacturing process flow for forming the aforementioned pixel areas with different alignment films on the first substrate or the second substrate is shown. As shown in FIG. 2A, the first substrate 110 has a number of first trenches 130 formed thereon. The first trenches 130 are formed by leaving one or more additional black matrices in the color resists during the conventional process of forming a black matrix on the first substrate 100, so no additional manufacturing process is required to form the first trenches 130 in this embodiment. Then, during a subsequent color resist etching process, the trenches with a width (w) and a length (l) are etched above the black matrix to form the first trenches 130. The first trenches 130 divide each of the pixel areas on the first substrate 100 into the first sub-pixel area 140 and second sub-pixel area 150, the first sub-pixel area 140 and second sub-pixel area 150 are surrounded by the first trenches 130, thus achieving a multi-domain division on the substrate. In application, each of the trenches has a depth (d) substantially ranging from 0.5 μm to 10 μm and a width (w) substantially ranging from 1 μm to 50 μm. However, the depth (d) and width (w) of the trenches may vary according to the design or location of the trenches in the pixels. Hereinafter, the coating of the same or different alignment materials on the individual pixel areas of the pixel structure through an inkjet printing process will be described in detail.

Figure 2B:
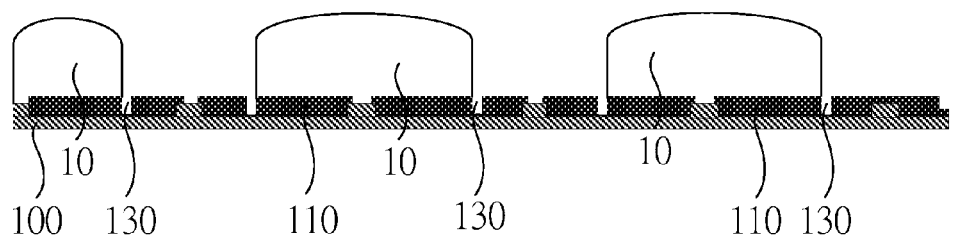
Figure 2C:
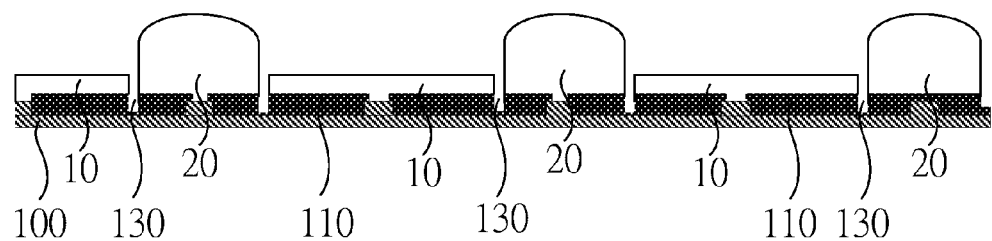
Figure 2D:
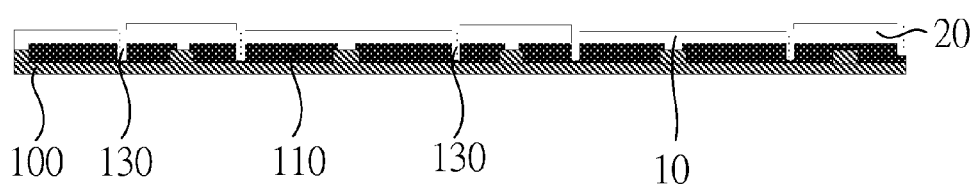

Then, the first alignment film is coated. As shown in FIG. 2B, the size and location of the ink drops are controlled in such a way so that the first alignment film material 10 is coated only on one side of the first trenches 130, and not in the first trenches 130. After the first alignment film material 10 is dried, the second alignment film material 20 is coated on the other side of the trenches 130, and not in the first trenches 130, as shown in FIG. 2C. Finally, a single drying process is carried out to dry the second alignment film material 20, as shown in FIG. 2D. Alternatively, in practice, the two alignment film materials may be coated respectively at first, and then a single drying process is carried out to form the first alignment film 10 and second alignment film 20 simultaneously.

Figure 3:
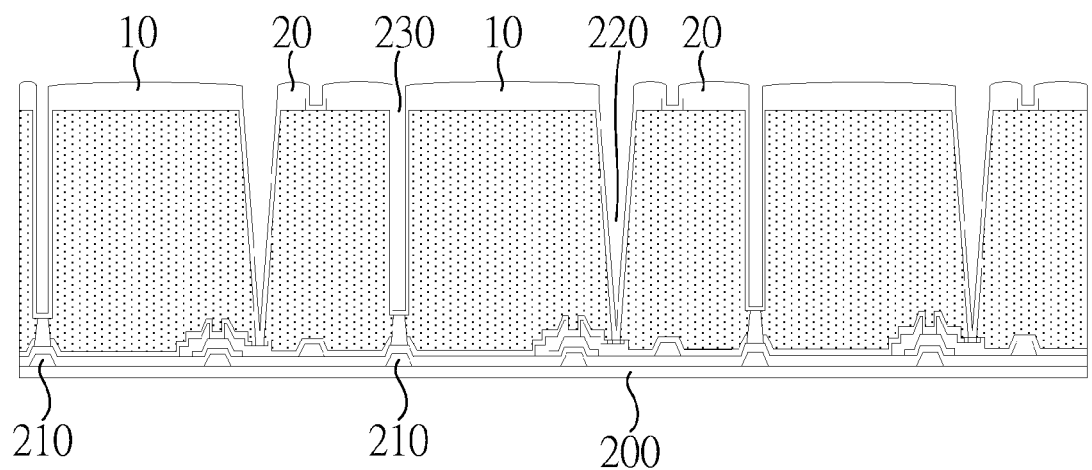
FIG. 3 depicts an example in which this invention is applied to a TFT glass substrate of an LCD.

Next, as shown in FIG. 3, the invention is applied to a TFT glass substrate of an LCD. In this embodiment, at least one second trench 230 is spaced apart and formed on the second substrate 200. The second trenches 230 spaced apart may further divide each pixel area of the entire pixel structure on the TFT glass substrate into two or more sub-pixel areas to facilitate the coating of different alignment film materials on each of the pixel areas. As a result, the different pre-tilt angles will be obtained for liquid crystal molecules in each of the pixel areas.

In the preferred example, the second trench 230 is formed by etching a trench with a width (w) and a length (l) on an organic layer of the second substrate 200 when an opening 220 (e.g., a contact window) is made in the second substrate 200 to achieve a multi-domain division. The organic layer may be a transparent material used in the Ultra High Aperture (UHA) technology or a color resist used in the Color filter On Array (COA) technology. In application, the trench substantially ranges from 0.5 μm to 10 μm in depth (d) and substantially ranges from 1 μm to 50 μm in width (w). However, the depth and width of the trenches may vary according to the design or location of the trenches in the pixels.

It should be emphasized that because the second trenches 230 are formed on the substrate concurrently when the opening is formed on the TFT glass substrate, no additional manufacturing process is required in this embodiment to form the trenches 230. Additionally, as previously described, the trenches 230 are preferably arranged directly above the pixel storage capacitor 210 on the second substrate 200 to mitigate the loss of the aperture ratio. Since the second trenches 230 divide each of the pixel areas of the pixel structure on the second substrate 200 into two sub-pixel areas and each of the two sub-pixel areas is surrounded by the second trenches 230, the first alignment material 10 and the second alignment material 20 with a thickness ranging from about 100 Å to 10,000 Å may be coated on both sides of the second trenches 230 in a similar manner as described above to obtain different alignment film materials in each of the pixel areas. To further mitigate the loss to the aperture ration, the second trenches 230 are preferably arranged at locations of the openings 220, directly above the pixel storage capacitor 210, to avoid the occupation of other locations on the TFT glass substrate as well as the consequent increase of the aperture ratio and light leakage.

The processes involved in dividing each pixel area on the TFT glass substrate or the CF glass substrate into two or more sub-pixel areas by forming trenches has been described above. Hereinafter, further applications of the above descriptions will be set forth. For example, different arrangements of alignment films may be used on the TFT and CF glass substrates of an LCD to solve different displaying problems of different types of displays.

FIGS. 4A and 4B illustrate the pixel units with different alignment film arrangements in the pixel structure of an LCD, where the pixel structure comprises a plurality of pixel units arranged in arrays. Each of the pixel units comprises a first substrate 100, a second substrate 200, a liquid crystal layer 400, first alignment films 10 and second alignment films 20. Similar to those described above, the first substrate 100 and the second substrate 200 are disposed correspondingly with the liquid crystal layer 400 filled in a gap between the first substrate 100 and the second substrate 200. The first alignment film 10 and the second alignment film 20 may be obtained by changing materials, thickness, surface conditions, rubbing directions or the like of the alignment films. In the description that follows, several specific applications of this invention will be described in detail with respect to the drawings.

The following description provides examples in which a multi-domain dividing process is performed on both the first and the second substrate. As shown in FIG. 4A and FIG. 4B, the first substrate 100, in each of the pixel units, has at least one first trench (not shown) to separate the first alignment film 10 and the second alignment film 20 on the first substrate 100. Likewise, the second substrate 200, in each of the pixel units, has at least one second trench (not shown) to separate the first alignment film 10 and the second alignment film 20 on the second substrate 200. As a consequence, each of the pixel areas on the first substrate 100 and the second substrate 200 in this embodiment has two sub-pixel areas. During the subsequent alignment film coating process, two first alignment films 10 and two second alignment films 20 can be coated on the two sub-pixel areas of the first substrate 100 and the second substrate 200 respectively. Particularly, in each pixel area, each of the first alignment film 10 is disposed substantially opposite to one of the two second alignment films 20.

In more detail, in the example shown in FIG. 4A, each of the first alignment films 10 is disposed substantially directly opposite to one of the two second alignment films 20. In contrast, in the example shown in FIG. 4B, each of the first alignment films 10 is disposed substantially obliquely opposite to one of the two second alignment films 20. In both examples, the different electric fields are generated on the left side and right side of each pixel area by using different alignment film arrangements on the first and the second substrates, which further results in different pre-tilt angles of liquid crystal molecules and helps to overcome the displaying problems suffered by different LCDs.

For instance, in the example shown in FIG. 4A, each pixel area has both a first alignment film 10 and a second alignment film 20 on both the left side and the right side thereof, so equal voltage differences will be expected on both sides of each pixel area. Such an arrangement is particularly adapted to a TN type LCD to reduce the response time thereof by effectively increasing the pre-tilt angle of liquid crystal molecules in the liquid crystal layer. On the other hand, in the example shown in FIG. 4B, each pixel area is coated with a single kind of alignment material on either side thereof. For instance, in the pixel area shown in FIG. 4B, the first substrate 100 and the second substrate 200 are both coated with the first alignment film 10 on the right side and both coated with the second alignment films 20 on the left side. Hence, the electric fields resulting in unequal voltage differences will be expected on the left side and the right side of each pixel area. Such an alignment film arrangement is particularly adapted to a VA type LCD. More specifically, the side of the pixel area exhibiting a larger voltage difference may help to shorten the response time by increasing the pre-tilt angle of the liquid crystal molecules in the liquid crystal layer. The other side exhibits a smaller voltage difference to avoid an excessively large pre-tilt angle of liquid crystal molecules therebetween, thereby, maintaining a certain level of transmittance in the display and preventing color wash-out at large viewing angles.

Figure 5A:
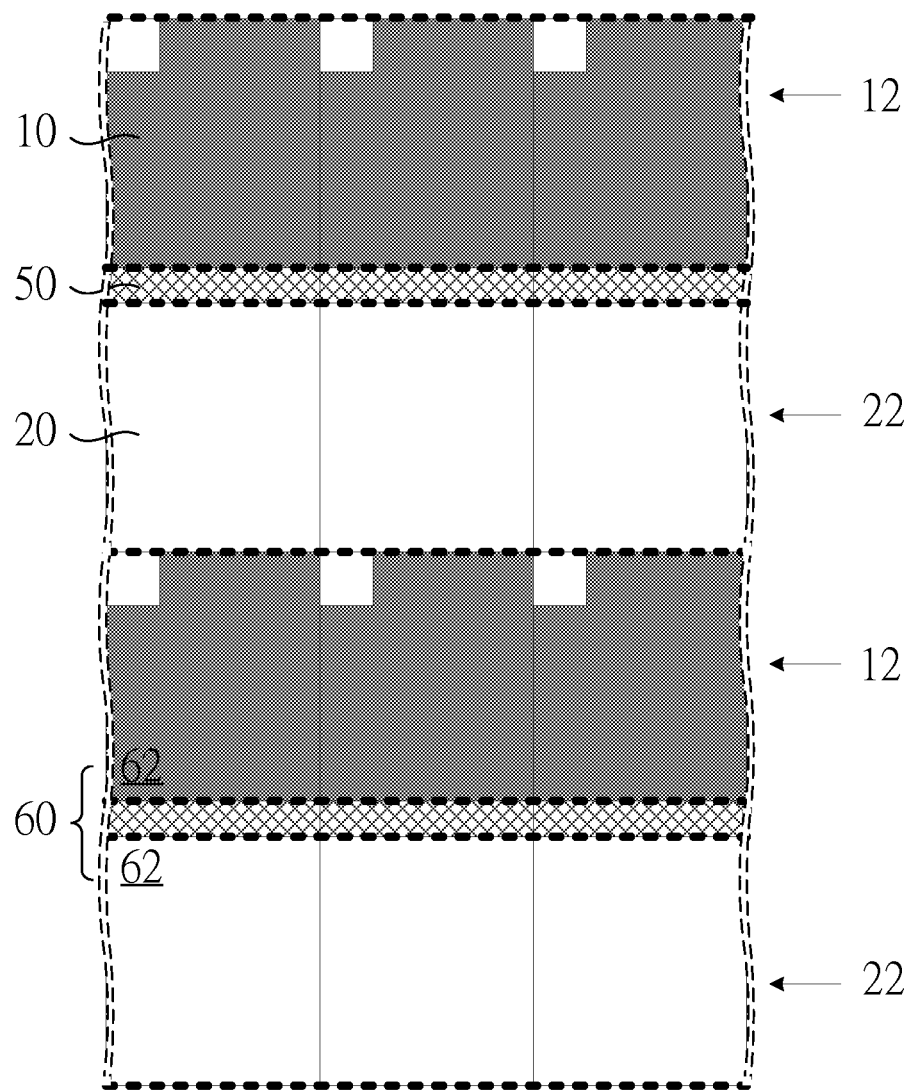
FIGS. 5A and 5B depict a plurality of pixel units arranged in arrays on a substrate of an LCD in accordance with this invention respectively.
Figure 5B:
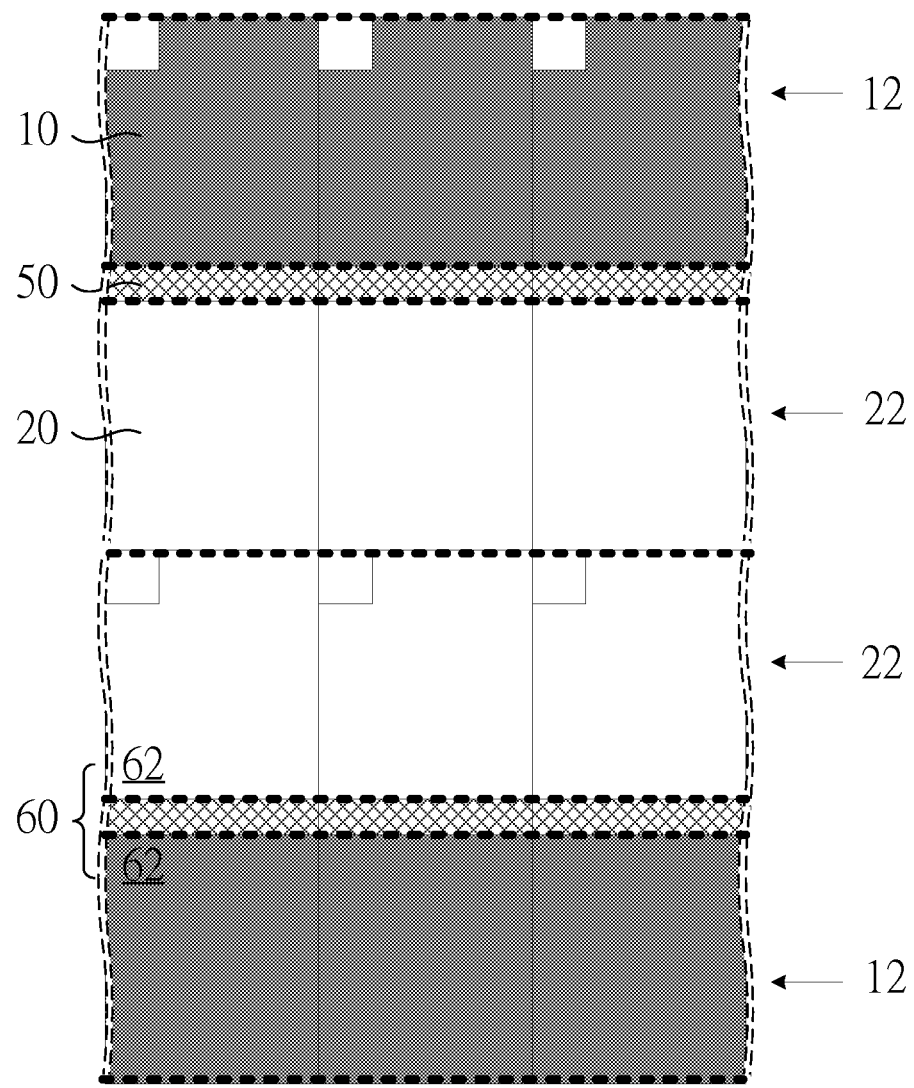

Furthermore, when the multi-domain dividing technology of this invention is applied to the entire CF glass substrate or TFT glass substrate of an LCD, several possible alignment film layouts may be formed on the CF glass substrate or TFT glass substrate. For example, FIGS. 5A and 5B show adjacent disposition relationships among a plurality of pixel units arranged in the arrays on the CF glass substrate or the TFT glass substrate of the LCD. Here, each pixel unit 60 on the CF glass substrate or the TFT glass substrate is divided into two sub-pixel areas 62 by spacers 50 such as the first and/or the second trenches. Each of the sub-pixel areas 62 is then coated with the first alignment film 10 or second alignment film 20 through an inkjet printing process.

For example, as shown in FIG. 5A, a plurality of equally or unequally spaced spacers 50 are formed on the CF or the TFT substrate to divide each of the pixel areas into two sub-pixel areas. Then, a first alignment film 10 is formed on one of the two sub-pixel areas 62. Finally, the second alignment film 20 is formed on the other sub-pixel area 62 in such a way that for every two adjacent pixel areas in at least a portion of the substrate, the first alignment films 10 of the two adjacent pixel areas are disposed adjacent to each other, like the second alignment films 20 thereof. That is, the first alignment films of adjacent pixel areas form a plurality of continuous first alignment film bands 12. The second alignment films of adjacent pixel areas form a plurality of continuous second alignment film bands 22, with the individual continuous first alignment film band 12 and the individual continuous second alignment film band 22 alternately disposed.

As another example shown in FIG. 5B, a plurality of equally or unequally spaced spacers 50 are formed on the CF or the TFT substrate to divide each of the pixel areas into two sub-pixel areas. Then, a first alignment film 10 is formed on one of the two sub-pixel areas 62. Finally, a second alignment film 20 is formed on the other sub-pixel area 62 in such a way that for two adjacent pixel areas in at least one portion of the substrate, the first alignment film 10 of one pixel area and the second alignment film 20 of the other pixel area are disposed adjacent to each other. That is, adjacent sub-pixel areas form a plurality of continuous first alignment film bands 12 and a plurality of continuous second alignment film bands 22 on the CF or the TFT substrate. In this case, every two continuous first alignment film bands 12 are disposed adjacent to each other like the every two continuous second alignment film bands 22 disposed adjacent to each other. Every two adjacent continuous first alignment film bands 12 and every two continuous second alignment film bands 22 are alternately disposed.

Furthermore, several different implementations may be obtained by using the layouts shown in FIGS. 5A and 5B in combination with the alignment film arrangements between the first and the second substrates shown in FIGS. 4A and 4B, and will be described as follows.

Figure 6A:
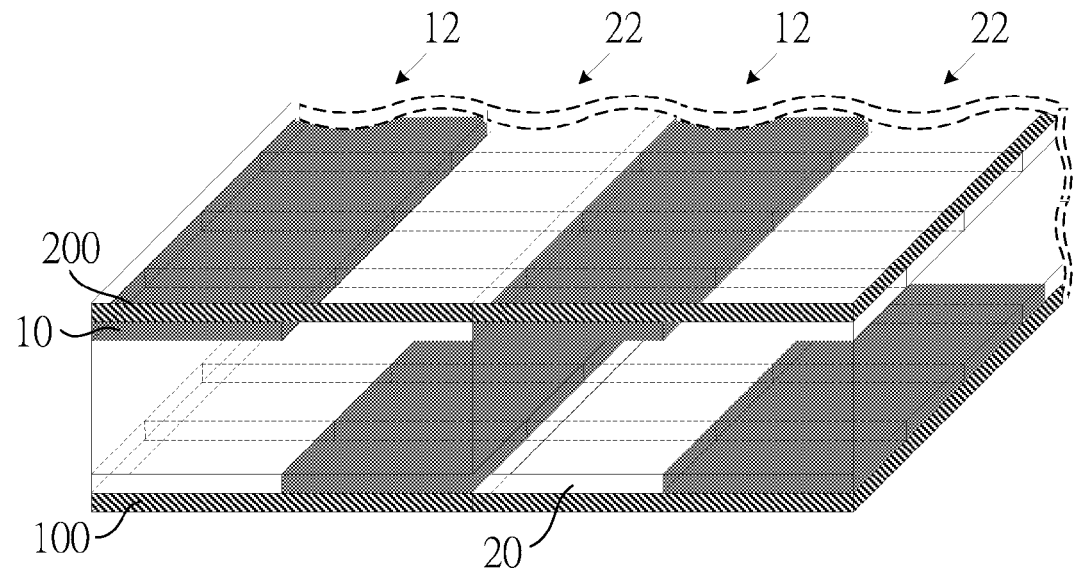
FIGS. 6A, 6B, 6C and 6D are schematic views of different alignment film arrangements on the CF and TFT substrates in an LCD of this invention respectively.

FIG. 6A illustrates an embodiment combining the arrangement of FIG. 4A and the layout of FIG. 5A. The first alignment films 10 on one substrate are substantially disposed directly opposite to the second alignment films 20 on the other substrate. Furthermore, the second alignment films 20 on the first substrate 100 are disposed adjacent to each other like the second alignment films 20 on the second substrate 200. That is, the first alignment films 10 on one substrate are disposed directly opposite to the second alignment films 20 on the other substrate. The individual continuous first alignment film bands 12 and individual continuous second alignment film bands 22 are alternately disposed on each substrate.

Figure 6B:
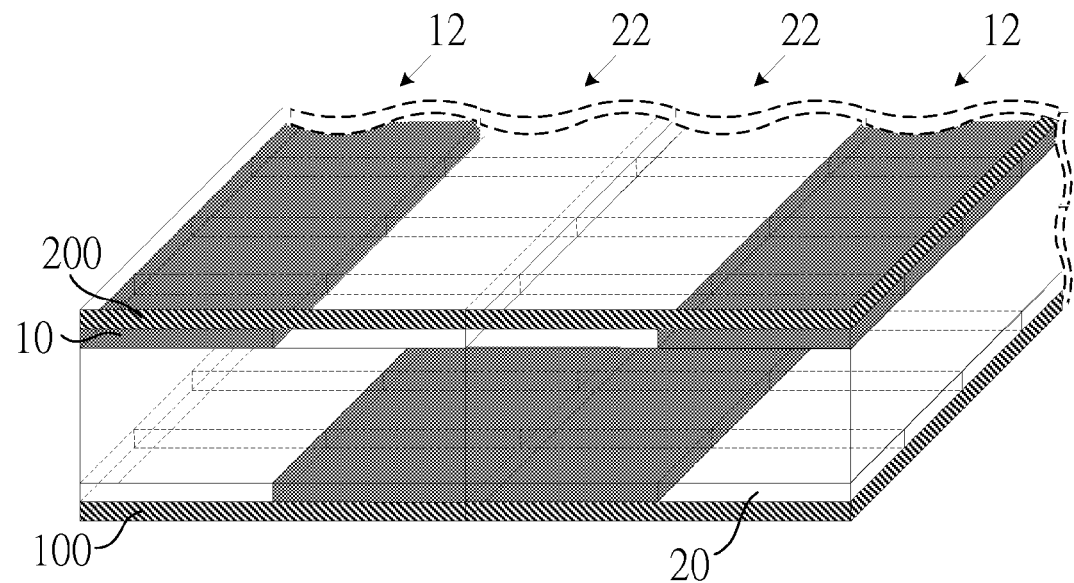

FIG. 6B illustrates an embodiment combining the arrangement of FIG. 4A and the layout of FIG. 5B. In addition to the first alignment films 10 that are disposed directly opposite to the second alignment films 20 on the other substrate, the first alignment films 10 on the first substrate 100 are disposed adjacent to each other, along with the first alignment films 10 on the second substrate 200. That is, the first alignment films 10 on one substrate are disposed directly opposite to the second alignment films 20 on the other substrate, and every two adjacent continuous first alignment film bands 12 and every two adjacent continuous bands 22 are alternately disposed on each substrate.

Figure 6C:
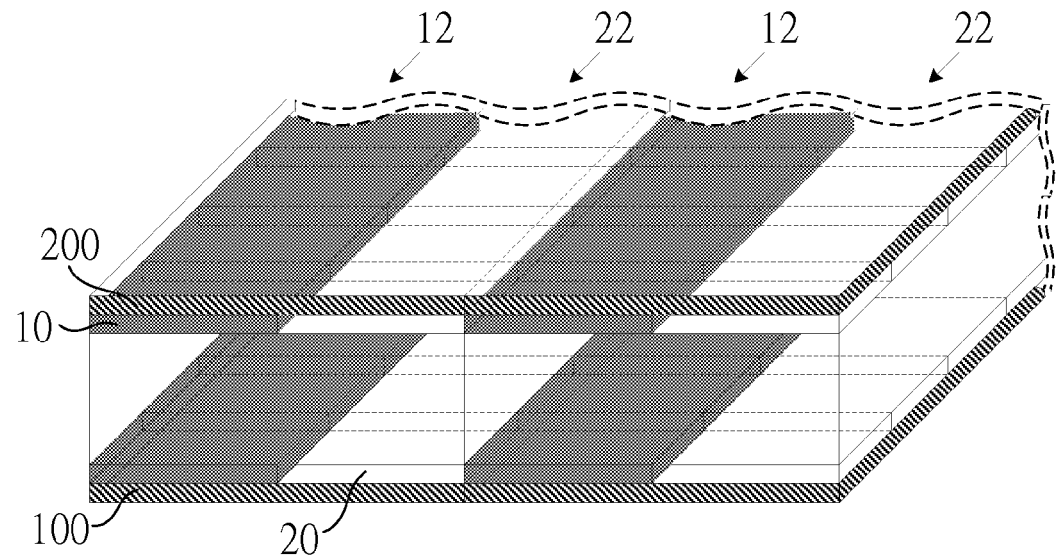

FIG. 6C illustrates an embodiment combining the arrangement of FIG. 4B and the layout of FIG. 5A. The first alignment films 10 on one substrate are substantially disposed obliquely opposite to the second alignment films 20 on the other substrate. Furthermore, the first alignment films 10 on the first substrate 100 are disposed adjacent to each other, along with the second alignment films 20 on the second substrate 200. That is, the first alignment films 10 on one substrate are disposed obliquely opposite to the second alignment films 20 on the other substrate, and the individual continuous first alignment film bands 12 and individual continuous second alignment film bands 22 are alternately disposed on each substrate.

Figure 6D:
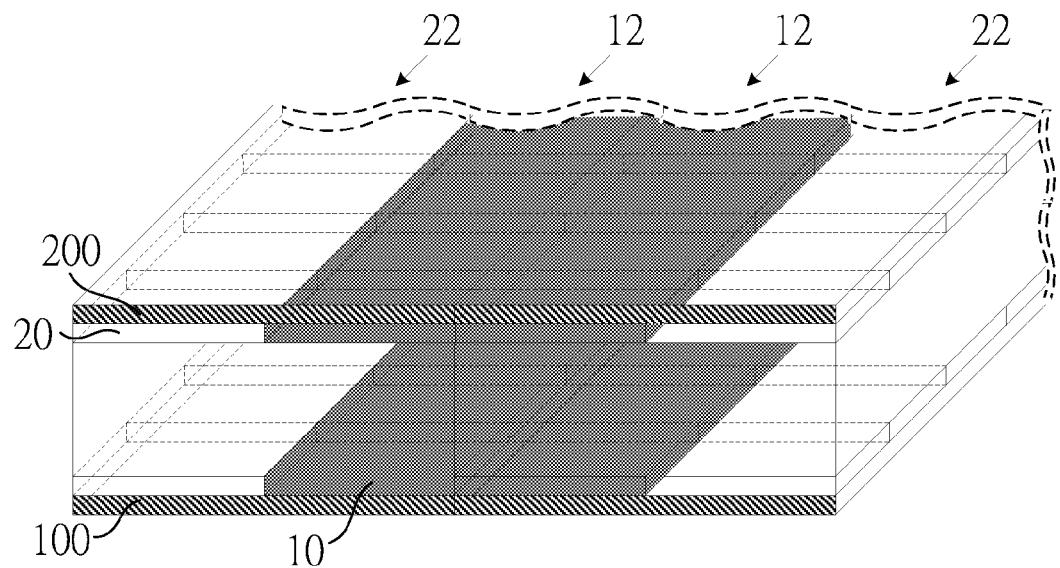

FIG. 6D illustrates an embodiment combining the arrangement of FIG. 4B and the layout of FIG. 5B. In addition to the first alignment films 10 that are substantially disposed obliquely opposite to the second alignment films 20 on the other substrate, the second alignment films 20 on the first substrate 100 are disposed adjacent to each other, along with the first alignment films 10 on the second substrate 200. That is, the first alignment films 10 on one substrate are disposed obliquely opposite to the second alignment films 20 on the other substrate, and every two adjacent continuous bands 12 and every two adjacent continuous bands 22 are alternately disposed on each substrate.

In conclusion, this invention divides each pixel area of the glass substrates in an LCD by using the multi-domain dividing technology without requiring any additional development and etching process. As a result, each of the pixel areas can be coated with different alignment film materials to obtain several variations of alignment film arrangement to improve the display performance of the LCD by affecting the pre-tilt angle of liquid crystal molecules in the liquid crystal layer.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for forming multiple alignment films on a substrate, the substrate comprising a plurality of pixel areas arranged in arrays, the method comprising the steps of:
    forming a trench on the substrate to divide each of the pixel areas into a first sub-pixel area and a second sub-pixel area, wherein each of the first sub-pixel area and the second sub-pixel area is surrounded and looped by the trench;
    forming a first alignment film by a step of inkjet printing on the substrate in the first sub-pixel area looped by the trench, and not in the trench; and
    forming a second alignment film by a step of inkjet printing on the substrate in the second sub-pixel area looped by the trench, and not in the trench, wherein the first alignment film and the second alignment film are using different alignment materials.

2. The method as claimed in claim 1, wherein the substrate includes a color filter substrate.

3. The method as claimed in claim 1, wherein the substrate includes an array substrate.

4. The method as claimed in claim 1, wherein the step of forming the trench comprises forming the trench with a depth substantially between 0.5 and 10 micrometers and a width substantially between 1 and 50 micrometers.

5. The method as claimed in claim 1, wherein the steps of forming the first alignment film and the second alignment film comprise the step of forming the first alignment films adjacent to each other and the second alignment films adjacent to each other in at least one portion of two adjacent pixel areas on the substrate.

6. The method as claimed in claim 1, wherein the steps of forming the first alignment film and the second alignment film comprise the step of forming the first alignment film and the second alignment film adjacent to each other in at least one portion of two adjacent pixel areas on the substrate.

7. The method as claimed in claim 1, wherein a material of one of the first alignment film and the second alignment film is selected from one of a group consisting of a twisted nematic (TN) alignment material, a vertical alignment (VA) material and a in-plane switching (IPS) alignment material.

8. The pixel structure as claimed in claim 7, wherein a first thickness of the first alignment film is different from a second thickness of the second alignment film.

9. A multiple alignment films substrate, comprising:
a substrate having a plurality of pixel areas arranged in arrays;
a trench on the substrate to divide each of the pixel areas into a first sub-pixel area and a second sub-pixel area, where each of the first sub-pixel area and the second sub-pixel area is surrounded and looped by the trench;
a first alignment film on the substrate in the first sub-pixel area looped by the trench, and not in the trench; and
a second alignment film on the substrate in the second sub-pixel area looped by the trench, and not in the trench, wherein the first alignment film and the second alignment film are using different alignment materials.

10. The multiple alignment films substrate as claimed in claim 9, wherein the substrate includes a color filter substrate.

11. The multiple alignment films substrate as claimed in claim 9, wherein the substrate includes an array substrate.

12. The multiple alignment films substrate as claimed in claim 9, wherein the trench has a depth substantially between 0.5 and 10 micrometers and a width substantially between 1 and 50 micrometers.

13. The multiple alignment films substrate as claimed in claim 9, the first alignment films are adjacent to each other and the second alignment films are adjacent to each other in at least one portion of two adjacent pixel areas.

14. The multiple alignment films substrate as claimed in claim 9, wherein the first alignment film and the second alignment film are adjacent to each other in at least one portion of two adjacent pixel areas.

15. The multiple alignment films substrate as claimed in claim 14, wherein the trenches are arranged above the pixel storage capacitors.

16. The multiple alignment films substrate as claimed in claim 9, wherein a material of one of the first alignment film and the second alignment film is selected from one of a group consisting of a twisted nematic (TN) alignment material, a vertical alignment (VA) material and a in-plane switching (IPS) alignment material.

17. The multiple alignment films substrate as claimed in claim 9, wherein a first thickness of the first alignment film is different from a second thickness of the second alignment film.

\* \* \* \* \*